(12) United States Patent
Huang et al.

(10) Patent No.: US 11,169,863 B2
(45) Date of Patent: Nov. 9, 2021

(54) DYNAMIC MANAGEMENT METHOD FOR MENU, SERVER AND SYSTEM

(71) Applicant: ZTE CORPORATION, Guangdong (CN)

(72) Inventors: Yuanyuan Huang, Guangdong (CN); Yingchun Fu, Guangdong (CN); Xuesheng Liu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/055,123

(22) PCT Filed: Jun. 24, 2019

(86) PCT No.: PCT/CN2019/092478
§ 371 (c)(1),
(2) Date: Nov. 12, 2020

(87) PCT Pub. No.: WO2020/001391
PCT Pub. Date: Jan. 2, 2020

(65) Prior Publication Data
US 2021/0216381 A1   Jul. 15, 2021

(30) Foreign Application Priority Data
Jun. 25, 2018   (CN) .......................... 201810665814.5

(51) Int. Cl.
*G06F 9/54* (2006.01)
*G06F 3/0482* (2013.01)

(52) U.S. Cl.
CPC ............ *G06F 9/546* (2013.01); *G06F 3/0482* (2013.01); *G06F 9/542* (2013.01)

(58) Field of Classification Search
CPC .................................. G06F 9/54; G06F 9/546
USPC ......................................................... 719/313
See application file for complete search history.

(56) References Cited

U.S. PATENT DOCUMENTS

| 8,291,113 | B2* | 10/2012 | Miyazaki | ............... H04L 45/50 709/242 |
| 8,364,145 | B2* | 1/2013 | Jheng | ............... H04M 1/72457 455/435.1 |
| 9,081,580 | B2* | 7/2015 | Gaffney | ................... G06F 8/38 |
| 10,027,728 | B2* | 7/2018 | Yang | ................... G06F 11/2097 |
| 2014/0228014 | A1* | 8/2014 | Tervo | ................ G06Q 20/3223 455/419 |

(Continued)

FOREIGN PATENT DOCUMENTS

| CN | 101374273 A | 2/2009 |
| CN | 102436380 A | 5/2012 |

OTHER PUBLICATIONS

International search report of PCT Patent Application No. PCT/CN2019/092478 dated Oct. 9, 2019.

*Primary Examiner* — Andy Ho (57) ABSTRACT

A dynamic management method for a menu, a server, and a system are disclosed. The method includes: collecting, when a function on each independently deployed functional unit changes, a menu change message generated when the function changes; receiving the menu change message through a message-oriented middleware deployed in a cluster manner, and broadcasting the menu change message; and monitoring and parsing, at a portal unit, the menu change message, and updating a menu displayed on an interface.

7 Claims, 5 Drawing Sheets

(56) References Cited

U.S. PATENT DOCUMENTS

| | | | |
|---|---|---|---|
| 2014/0282248 A1* | 9/2014 | Reeves | G06Q 10/107 715/825 |
| 2015/0120463 A1* | 4/2015 | Cannon | G06Q 30/0268 705/14.65 |

* cited by examiner

DYNAMIC MANAGEMENT METHOD FOR MENU, SERVER AND SYSTEM

CROSS-REFERENCE TO RELATED APPLICATIONS

This application claims the priority of the Chinese patent application CN201810665814.5 entitled "Dynamic management method for menu, server, system, and computer-readable storage medium" and filed on Jun. 25, 2018, the entire content of which is incorporated herein by reference.

FIELD OF THE INVENTION

This present disclosure relates to the field of computer network technology, and in particular to a dynamic management method for a menu, a server, a system, and a computer-readable storage medium.

BACKGROUND OF THE INVENTION

In a dynamically managed system, such as a system with a microservice architecture, functions are split into independent microservices. Microservices can run, be deployed, be upgraded, and be uninstalled independently. A dynamically managed system usually requires that a menu also dynamically change following a change of a function, i.e., requiring that the menu of the function be dynamically added or updated when the function is deployed, and the menu corresponding to the function can be dynamically uninstalled when the function is uninstalled. In addition, an independently deployed function can provide service capabilities independently. These service capabilities can be flexibly combined. Different sets of functions can be provided for different scenarios, and a menu is provided only within a set of functions. A typical application scenario is a multi-tenant scenario. In the multi-tenant scenario, a full set of functions is deployed in a background, and then these service capabilities are combined together according to tenants' purchase of services. A menu that can be seen on a tenant's portal is only the menu corresponding to a function that has been purchased. Demands for dynamic management for a menu can involve two aspects. The first is to realize dynamic management for the menu according to installation and uninstallation of a function. The second is to combine capabilities in a system into function sets as needed and different function sets correspond to different portals, menus on the portals being also required to match theses function sets, so that a menu set corresponding to a function set can be flexibly provided.

In some cases, in a dynamic management method for a menu, when each of different independent functions is deployed, a menu registration message is sent to a menu management module or the menu management module automatically collects a menu from each of these functions; the menu management module merges these menus, and then a menu display module displays these menus. However, menu management is handled by a single menu management module, and the menu management module is a central node dedicated to menu processing. The menu management module may therefore become a bottleneck. For example, when the module itself has problems or is not deployed, menus cannot be registered, merged and displayed normally, rendering the entire system unavailable and thus lacking in robustness.

SUMMARY OF THE INVENTION

The present disclosure provides a dynamic management method for a menu, a server, a system, and a computer-readable storage medium, aiming to solve the problem that a system lacks robustness when a single menu management module is responsible for registration, merging, and display of a menu.

To achieve the foregoing objective, the present disclosure, according to a first aspect of embodiments thereof, provides a dynamic management method for a menu. The method includes:

collecting, when a function on an independently deployed functional unit changes, a menu change message generated when the function changes;

receiving the menu change message through a message-oriented middleware deployed in a cluster mode, and broadcasting the menu change message; and monitoring and parsing, at a portal unit, the menu change message, and updating a menu displayed on an interface.

The present disclosure, according to a second aspect of embodiments thereof, provides a server. The server includes a processor, a memory, and a data bus.

The data bus is configured to realize connection and communication between the processor and the memory.

The processor is configured to execute a memory model calculation program stored in the memory so as to implement the following steps:

collecting, when a function on an independently deployed functional unit changes, a menu change message generated when the function changes;

receiving the menu change message through a message-oriented middleware deployed in a cluster mode, and broadcasting the menu change message; and monitoring and parsing, at a portal unit, the menu change message to obtain a menu display file.

The present disclosure, according to a third aspect of embodiments thereof, provides a dynamic management system for a menu. The system includes at least one server and a plurality of clients, the server being provided therein with a plurality of functional units and a plurality of portal units, and the clients each being provided with a display interface corresponding to a respective one of the portal units. In the system, the following steps are implemented:

collecting, when a function on an independently deployed functional unit changes, a menu change message generated when the function changes;

receiving the menu change message through a message-oriented middleware deployed in a cluster mode, and broadcasting the menu change message;

monitoring and parsing, at a portal unit, the menu change message to obtain a menu display file; and sending the menu display file to a corresponding display interface, and updating a menu on the display interface.

The present disclosure, according to a fourth aspect of embodiments thereof, provides a computer-readable storage medium. The computer-readable storage medium stores one or more programs which are executable by one or more processors so as to implement steps of the dynamic management method for a menu as described above.

From the above technical solutions, it can be known that according to the dynamic management method for a menu, the server, the system, and the computer-readable storage medium provided by the embodiments of the present disclosure, menu change messages are forwarded and temporarily stored through a message-oriented middleware cluster, and there is no longer a need for a dedicated central node for menu processing. Menu information that is not written into the storage is saved in the message-oriented middleware. Once a unit capable of menu processing is started or runs normally, it can process, store, and merge menu messages.

Due to the cluster deployment mode of the message-oriented middleware, even if a message-oriented middleware instance is abnormal, it will not affect registration and uninstallation of menus in the system. The system adopts a decentralized architecture, and all the modules are independent of one another in terms of startup sequence. Even if the menu change management module and the menu merging module are started after a menu is registered, the menu change management module and the menu merging module can still obtain the registered menu after being started.

In addition, by creating a unified menu model, definition of menus becomes more standardized and consistent, which ensures correctness of menu registration and logic of subsequent merging of menus. When the menus are merged, an existing menu set in the system is customized according to a function subset defined by a current portal unit, which renders the menu processing more flexible. For all changes of functions, a menu can be flexibly modified to make the menu consistent with the functions.

The realization of the objectives, as well as functional features and advantages of the present disclosure will be further described in conjunction with embodiments and with reference to the accompanying drawings.

DETAILED DESCRIPTION OF THE EMBODIMENTS

It shall be appreciated that the specific embodiments described herein are provided only for illustrating, rather than limiting, the present disclosure.

In the following description, suffixes such as "module", "component" or "unit" used to denote elements are used only for facilitating the description of the present disclosure, and these suffixes per se have no special meanings. Therefore, "module", "component", and "unit" can be used in a mixed manner.

In some cases, in a dynamic management method for a menu, when each of different independent functions is deployed, a menu registration message is sent to a menu management module or the menu management module automatically collects a menu from each of these functions; the menu management module merges these menus, and then a menu display module displays these menus. This dynamic management scheme for menus takes the menu management module as a central node of the system. The foregoing has explained that this dynamic management scheme for menus lacks robustness and there is a risk of system breakdown when the central node fails. Due to the centralized architecture, there are requirements for the sequence of starting the independently deployed functions: menu management and menu display are both handled by a single menu management module; when menu registration is need for each independent function, it is necessary to start the module first, and then menu registration can be performed for other functions.

Directed against the defects of the above technical scheme, the present disclosure specifically provides the following embodiments.

Embodiment One

Figure 1:
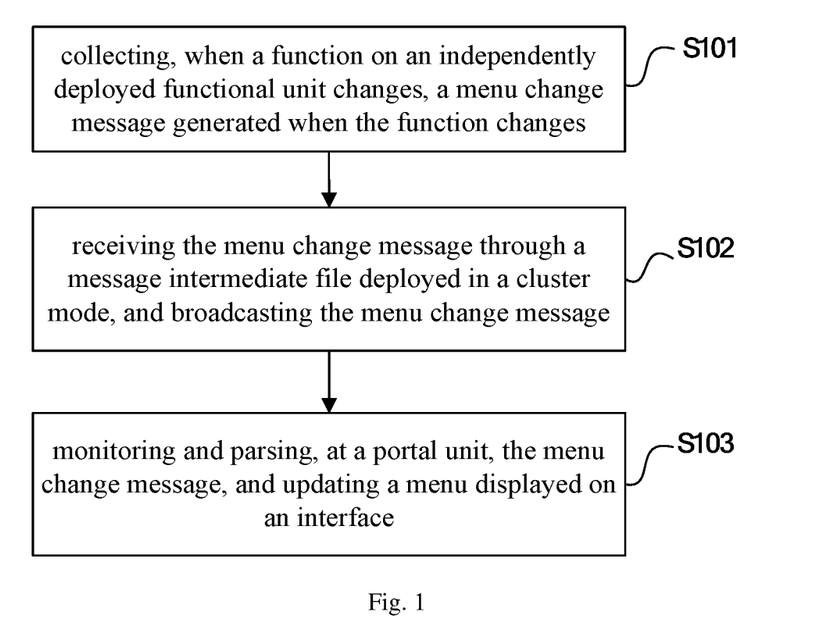
FIG. 1 is a flowchart of a dynamic management method for a menu according to an embodiment of the present disclosure.

As shown in FIG. 1, the present embodiment provides a dynamic management method for a menu. The method mainly includes step S101 to S103.

In step S101, when a function on an independently deployed functional unit changes, a menu change message generated when the function changes is collected.

A system usually consists of 1-n independently deployable functional units (the independently deployable functional units can be microservices or plug-ins). When a function is uninstalled or deployed, it triggers the generation of the menu change message. The menu change message includes a menu registration message and a menu uninstallation message.

In step S102, the menu change message is received through a message-oriented middleware deployed in a cluster mode, and the menu change message is broadcast Menu change messages that are not written into a storage are all stored in a message-oriented middleware, and the message-oriented middleware sends a broadcast notification to all message consumers monitoring menu changes in the system. Once a unit capable of menu processing is started or runs normally, a menu message can be processed, written to a database, merged, etc. Due to the cluster deployment mode of message-oriented middleware, even if a certain message-oriented middleware instance is abnormal, it will not affect registration and uninstallation of menus in the system. This embodiment selects Kafka as the message-oriented middleware. Messages received by Kafka are persisted on a hard disk, and even if the entire message-oriented middleware is restarted, the messages will not be lost. Processing of changes, merging, etc., of menus can be processed separately by multiple portals, without relying on a centralized menu processing module. This makes the dynamic management scheme for menus robust.

In step S103, the menu change message is monitored and parsed at a portal unit, and a menu displayed on an interface is updated.

Figure 2:
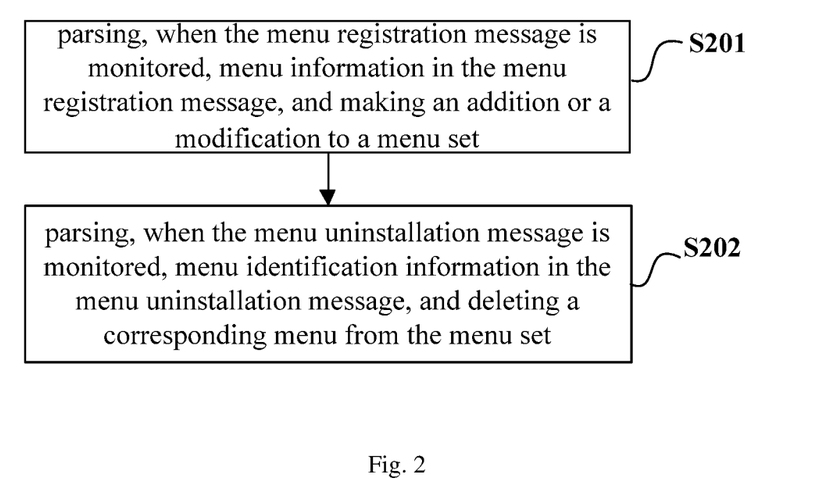
FIG. 2 is a flowchart of a second level override update processing method according to an embodiment of the present disclosure.

For the case that the function is uninstalled and the case that the function is deployed when the menu change message is generated, corresponding operations are menu deletion and menu registration, respectively. Specifically, as shown in FIG. 2, the parsing of the menu change message includes the following steps S201 and S202.

In step S201, when the menu registration message is monitored, menu information in the menu registration message is parsed, and an addition or a modification is made to a menu set.

In step S202, when the menu uninstallation message is detected, menu identification (ID) information in the menu uninstallation message is parsed, and a menu corresponding to the menu ID is deleted from the menu set.

Before collecting the menu change message generated when the functional changes, the method further includes: creating a unified menu model, separately defining a menu of respective functional units according to the unified menu model, and generating a corresponding menu definition file.

(2) A system in which a plug-in architecture for functions is adopted also has same characteristics as the microservice architecture. The dynamic management of menus of the present disclosure can therefore well adapt to the flexibility of the dynamic management system.

(3) In a distributed system, functions in the system are deployed independently in a distributed manner. In this scenario, the dynamic menu management can well adapt to the flexibility of the distributed system.

When the function on the independently deployed functional unit changes, before the menu change message generated when the function changes is collected, menu information corresponding to respective functional units is persisted using a distributed database or a distributed cache so as to generate a menu set. To persist means to save or delete menu messages for queries.

Figure 3:
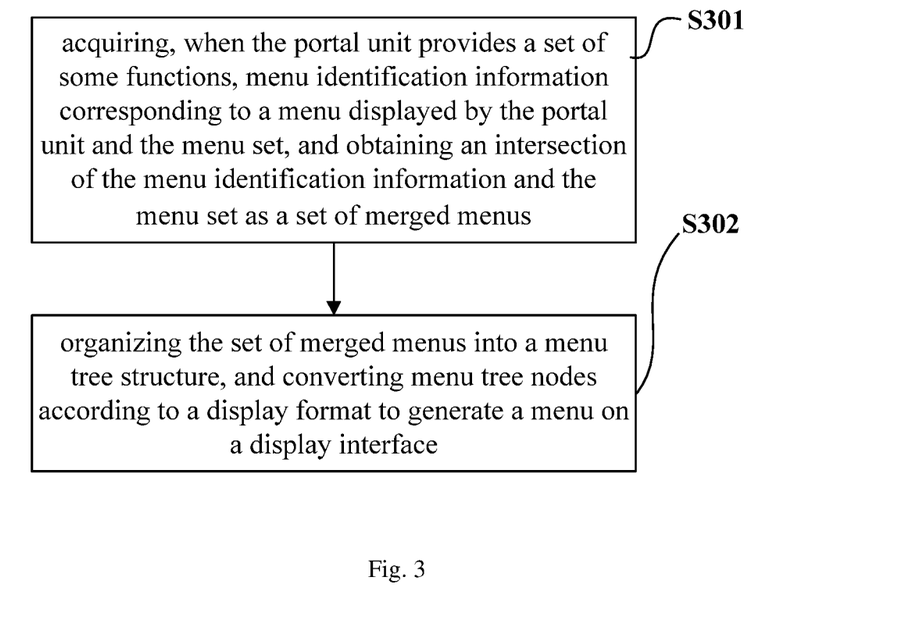
FIG. 3 is a flowchart of a third level override update processing method according to an embodiment of the present disclosure.

As shown in FIG. 3, after the menu change message is monitored and parsed at the portal unit, and a menu displayed on the interface is updated, the method further includes the following steps S301 and S302.

In step S301, when the portal unit needs to provide a set of some functions, menu identification information corresponding to menus to be displayed by the portal unit and the menu set are acquired, and the menu identification information and the menu set are intersected to obtain a set of merged menus.

In step S302, the set of merged menus are organized into a menu tree structure; menu tree nodes are converted according to a display format; and a menu is generated on the display interface.

Specifically, when the menus are merged, the menu tree structure is organized according to configured parentIDs. Menus with a same parentID are placed on a same level, and menus on a same level are sorted according to order configuration. If menus on a same level have a same group, these menus are considered to belong to a same group, and menus of a same group are arranged together. After the menu tree structure is generated, menu tree nodes are converted, according to a display format, to a format required by display of the interface. In this embodiment, the menu tree nodes are converted into html fragments that can be directly parsed by a browser.

TABLE 1

Structure defined for a menu model

| attribute name | ID | name | | pageid | position | | | display_attr | | right | |
|---|---|---|---|---|---|---|---|---|---|---|---|
| | | name_zh | name_en | | parent | order | group | icon | display | operation | license |
| attribute meaning | ID | Chinese name | English name | page ID | parent menu | order | group | icon | display or not | authentication | license |
| value constraint | string | string | string | string | string | int | int | string | boolean | string | string |

Table 1 shows a structure defined for a menu model provided by the present embodiment. Specifically, the menu model includes:

ID: identification of a menu, which is the only identification of a menu;

Name:

name_zh: Chinese name of a menu;

name_en: English name of a menu;

Page ID: identification of a functional page corresponding to a menu;

Position:

Parent: identification of a parent menu of a menu; a menu is allowed to have a hierarchical relationship; here a submenu is associated with a parent menu;

Order: order; when there are multiple submenus under a same parent menu, "order" is used to indicate a display order;

Group: group; multiple submenus under a same parent menu can be grouped, and submenus belonging to a same group are arranged together;

display_attr:

icon: icon of a menu;

Display: display or not; false indicates to hide a menu;

right:

Operation: authentication operation code corresponding to a menu; when a menu needs to be displayed on the interface, it is determined whether the operation code is authorized; if the operation code is authorized, the menu is displayed, and if the operation code is not authorized, the menu is deleted.

License: license authorization item corresponding to a menu; when a menu needs to be displayed on the interface, it is determined whether the license authorization item is authorized; if the license authorization item is authorized, the menu is displayed, and if the license authorization item is not authorized, the menu is deleted.

The above definition of the menu model may be widely used in all menu management scenarios, and is not limited to be used in scenarios that require dynamic management of menus. The others may be widely used in scenarios or fields where functions in a system can be installed, uninstalled, and upgraded independently. Examples are as follows (1) In a system adopting a microservice architecture, functions are independently provided in form of microservices that can be independently deployed, uninstalled, and upgraded. In this scenario, the dynamic management of a menu can well adapt to the flexibility of the microservice architecture.

Embodiment Two

Figure 4:
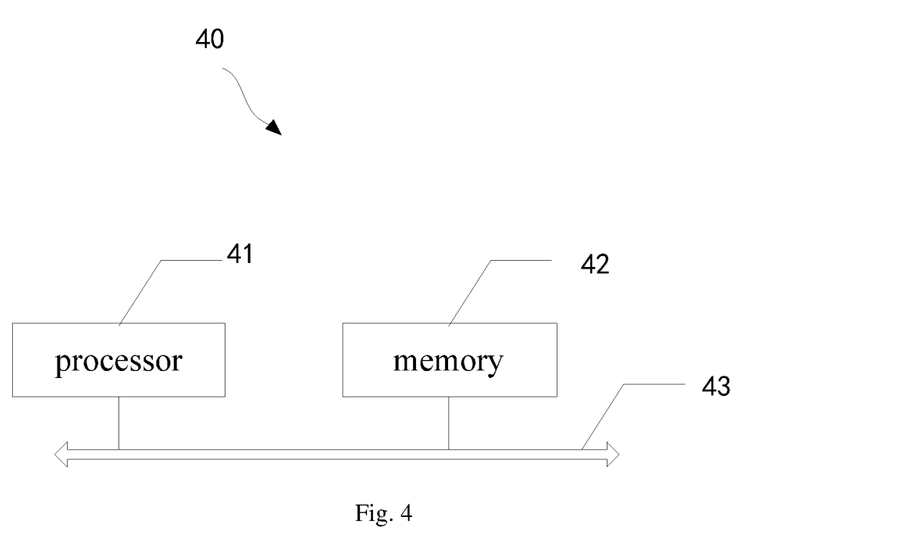
FIG. 4 is a block diagram showing a structure of a server according to an embodiment of the present disclosure.

The present embodiment provides a server. Specifically, as shown in FIG. 4, the server 40 at least includes a processor 401, a memory 402, and a data bus 403. The data bus 403 is configured to realize connection and communication between the processor 401 and the memory 402. The memory 402, as a computer-readable storage medium, may store at least one computer program. The at least one computer program may be read, compiled, and executed by the processor 401, so as to complete a corresponding processing flow. In this embodiment, the memory 402, as a computer-readable storage medium, stores a program for identifying a type of a downloaded file. The program is executable by the processor 401, so as to implement steps of a dynamic management method for a menu as follows.

When a function on an independently deployed functional unit changes, a menu change message generated when the function changes is collected.

The menu change message is received through a message-oriented middleware deployed in a cluster mode, and the menu change message is broadcast.

The menu change message is monitored and parsed at a portal unit to obtain a menu display file.

Embodiment Three

Figure 5:
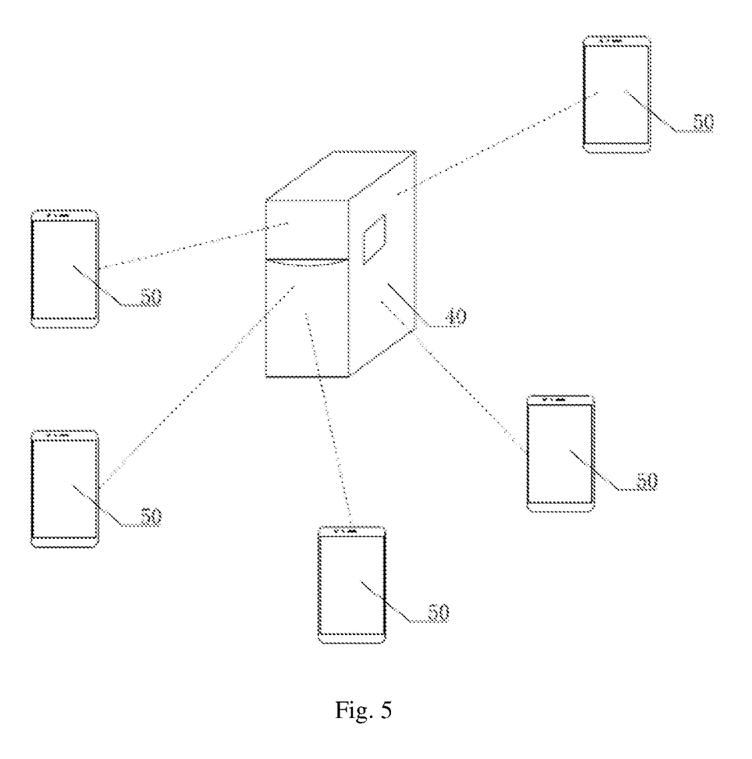
FIG. 5 is a block diagram showing a structure of a dynamic management system for a menu according to an embodiment of the present disclosure.

As shown in FIG. 5, the present embodiment provides a dynamic management system for a menu. The system at least includes a server 40 and a plurality of clients 50. The server 40 is provided therein with a plurality of functional units and a plurality of portal units. Each of the clients 50 is provided with a display interface corresponding to a respective one of the portal units. The following steps are implemented in the system.

When a function on an independently deployed functional unit changes, a menu change message generated when the function changes is collected.

The menu change message is received through a message-oriented middleware deployed in a cluster mode, and the menu change message is broadcast.

The menu change message is monitored and parsed at the portal unit to obtain a menu display file.

The menu display file is sent to a corresponding display interface, and a menu on the display interface is updated.

Figure 6:
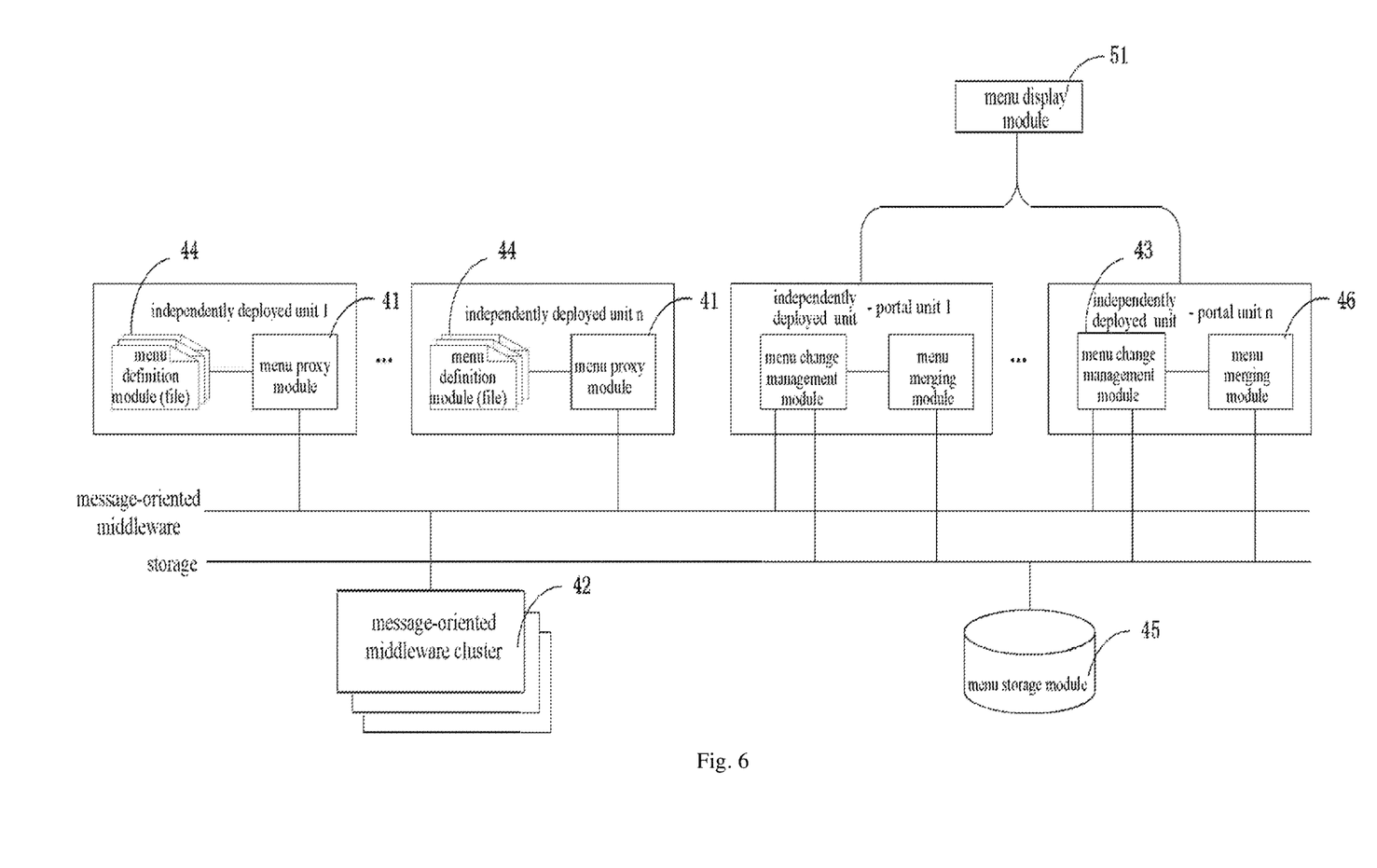
FIG. 6 is a block diagram showing structural division of modules of a dynamic management system for a menu according to an embodiment of the present disclosure.

As shown in FIG. 6, the system 40 may be divided into a plurality of functional modules, which specifically include a menu proxy module 41, a message-oriented middleware cluster 42, a menu change management module 43, a menu definition module 44, a menu storage module 45, and a menu merging module 46, and menu display module 51.

The menu proxy module 41 is provided in each functional unit in the server 40, and is configured to collect, when a function on an independently deployed functional unit changes, a menu change message generated when the function changes.

The menu proxy module 41 is deployed in form of a proxy on each of the independently deployed functional unit. When a function is deployed on a unit, the menu proxy module 41 is responsible for collecting a menu definition file of the unit and sending a menu registration message, and when the function is uninstalled, the menu proxy module 41 is responsible for acquiring all menu identifications registered by the unit and sending a menu uninstallation message.

The message-oriented middleware cluster 42 is configured to receive the menu change message through a message-oriented middleware deployed in a cluster mode, and to broadcast the menu change message.

The message-oriented middleware deployed in the cluster mode is responsible for receiving menu-related messages and notifying a message consumer monitoring a menu change. In this embodiment, a kafka cluster is used. Kafka is a high-throughput distributed publish-subscribe messaging system, and messages received by kafka are persisted to a local hard disk. Due to the cluster deployment mode, even if a certain Kafka instance is abnormal, it will not affect registration and uninstallation of menus in the system. As messages are persisted on the hard disk, even if the entire Kafka is restarted, the messages will not be lost. This ensures robustness of the dynamic management system for menus. Using Kafka to forward a message renders it unnecessary to configure a dedicated central node for user menu processing in the entire system. Menu information that is not written into the storage is saved on Kafka. Once a unit capable of menu processing is started or runs normally, menu messages can be processed, written to a database, merged, etc.

The menu change management module 43 is provided on each of the portal units, and is configured to monitor and parse the menu change message.

The menu change management module 43 is deployed on the portal unit. According to needs of the system, provided will be 1-n portal units. The menu change management module 43 on each of these portal units is responsible for monitoring a menu message on the message-oriented middleware and persisting a menu. If a menu registration message is monitored, message information in the menu registration message is parsed, and an addition or a modification is made to a menu storage. If a menu uninstallation message is monitored, menu identification information in the menu uninstallation message is parsed, and a corresponding menu is deleted from the menu storage.

The menu definition module 44 is configured in each of the functional units, and is configured to define a menu of each functional unit according to a unified menu model to generate a corresponding menu definition file.

A menu instance file is defined and developed according to the unified menu model. A menu instance file may have 1-n menus, and a same independently deployed functional unit (which may be a microservice, a plug-in, etc.) may have a plurality of menu files. These files are in json format and are placed under a fixed folder of the microservice.

The menu storage module 45 is configured to persist menu information corresponding to respective functional units separately by using a distributed database or a distributed cache so as to generate a menu set.

The menu merging module 46 is configured to detect whether the portal unit provides a set of some functions. When it is required that only some functions be provided, the menu merging module 46 reads menu identification information to be displayed by the portal unit and the menu set, and obtains an intersection of the menu identification information and the menu set as a set of merged menus. The set of merged menus is organized into a menu tree structure. Menu tree nodes are converted according to a display format so as to generate a menu display file.

The menu merging module 46 is deployed on the portal unit, and is responsible for reading menus from the menu storage and merging the menus. Before merging the menus, the menu merging module 46 determines whether the portal unit only needs to provide a set of some functions. If the menu merging module 46 determines that the portal unit only needs to provide a set of some functions, the menu merging module 46 takes an intersection of menus required by the portal unit and menus already existing in the system as the set of merged menus. When the menus are merged, the menu tree structure is organized according to configured parentIDs. Menus with a same parentID are placed on a same level, and menus on a same level are sorted according to order configuration. If menus on a same level have a same group, these menus are considered to belong to a same group, and menus of a same group are arranged together. After the menu tree structure is generated, menu tree nodes are converted, according to a display format, to a format required by the interface display. In this embodiment, the menu tree nodes are converted into html fragments that can be directly parsed by a browser.

The menu display module 51 is configured on the client 50, and is configured to update and display a functional menu passed through each of the portal units. The client 50 may be an application program such as a browser, which is integrated and installed on a mobile terminal product.

Specifically, the system consists of 1-n independently deployable functional units (the independently deployed functional units may be microservices or plug-ins). Each of the independently deployed functional units has a menu definition module and a menu proxy module, which are responsible for definition and registration of a menu of the unit. The message-oriented middleware is responsible for message delivery in the system, and is deployed in a cluster mode. The message-oriented middleware itself is robust. 1-n portal units (a type of independently deployed units configured to display a system entrance) are deployed in the system. Each of these portal units includes a menu change management module and a menu merging module, which are responsible for integration of menus. The menu storage module is responsible for persistence (storage or deletion) of menus. The menu display module is responsible for display of menus.

The foregoing described dynamic processing system for menus is a decentralized architecture. The system does not need a centralized menu processing module dedicated to menu change monitoring, menu change processing, and menu merging. Besides, there is no restriction on a startup sequence of the modules. Even if the menu change management module and the menu merging module are started after a menu is registered, the menu change management module and the menu merging module can still acquire the registered menu after being started.

Embodiment Four

The present embodiment provides a computer-readable storage medium. The computer-readable storage medium stores one or more programs which are executable by one or more processors so as to implement steps of the dynamic management method for menus as described above.

Figure 7:
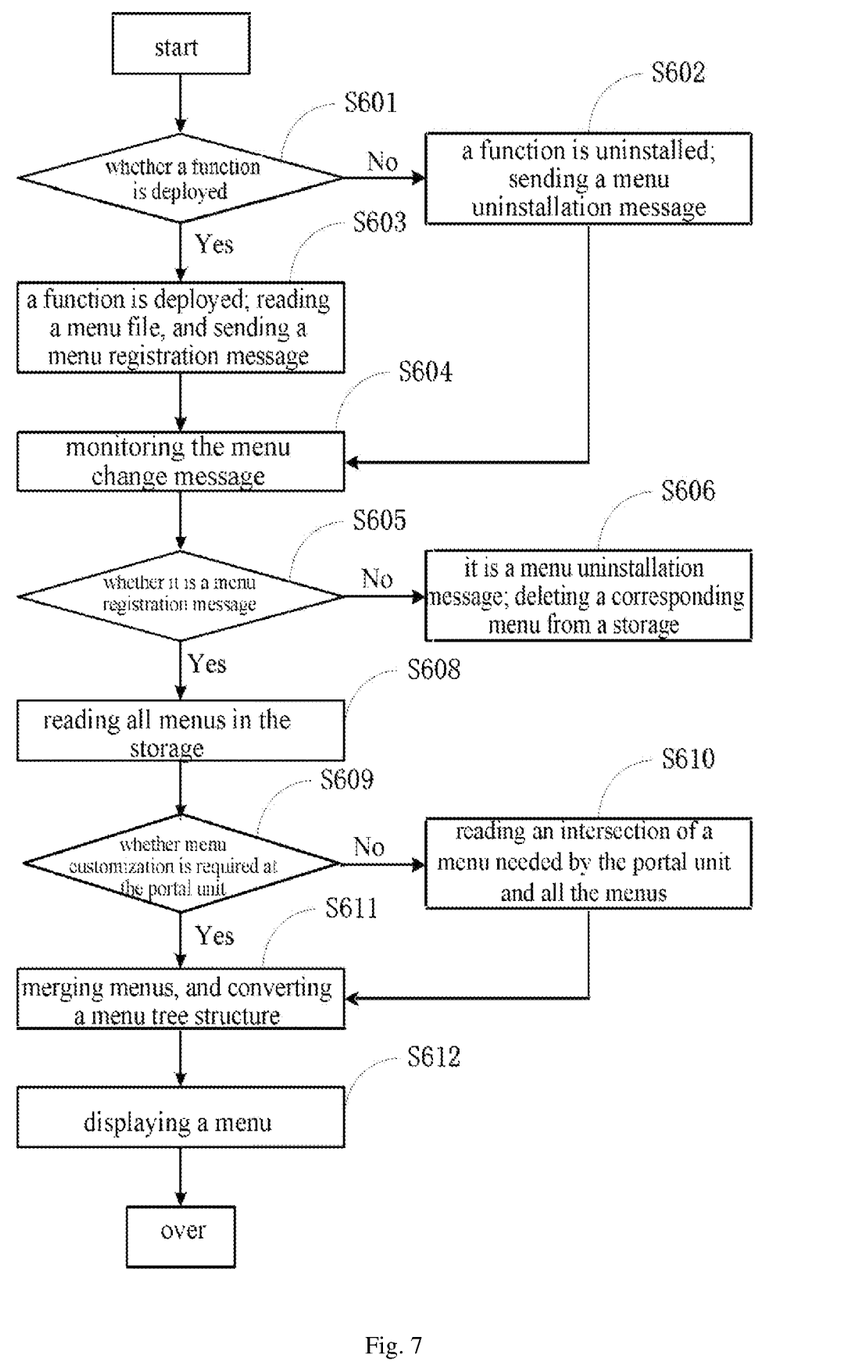
FIG. 7 is a working flowchart of a dynamic management method for a menu according to an embodiment of the present disclosure.

As shown in FIG. 7, the one or more programs specifically implement the following steps S601 to S612.

In Step S601, it is determined whether a function is currently deployed or uninstalled.

In step S602, if it is determined that a function is currently uninstalled, a menu identification associated with a current microservice is acquired, and a menu uninstallation message is sent to a message-oriented middleware (kafka is used in this embodiment as the message-oriented middleware). Alternatively, in step S603, it is determined that a function is currently deployed, a menu file under a folder specified by the current microservice is found and parsed, and information obtained in parsing the menu file is sent to the message-oriented middleware in form of a menu registration message.

In Step S604, a menu proxy module monitors and reads the menu change message in the message-oriented middleware.

In Step S605, it is determined whether the menu change message is a menu registration message or a menu uninstallation message.

In Step S606, if it is determined that the menu change message is a menu uninstallation message, a menu identification that needs to be deleted is taken out and a corresponding menu is deleted from a storage (the storage device used in this embodiment is PostGre distributed cache). In step S607, if it is determined that the menu change message is a menu registration message, menu content is taken out, verified, and the verified menu information is stored.

In Step S608, all menus in the storage are read.

In Step S609, it is determined whether menu customization is required (in a scenario where a portal unit only needs to display a set of some functions, a menu to be displayed is not a complete set).

In step S610, if menu customization is not required, an intersection of menu identifications that need to be displayed on a current portal unit and all the menus is obtained as a set of merged menus.

In step S611, menus in the set of merged menus are de-duplicated; remaining menus are defined according to a hierarchical relationship, organized into a menu tree structure in a certain order; the menu tree structure is converted, according to needs of display, into a menu structure that can be directly displayed; and then the menu structure is persisted to be a menu display file. (In this embodiment, the menu tree structure is converted into html fragments that can be directly displayed by a browser).

In step S612, the menu display file obtained by conversion is displayed. (In this embodiment, the browser initiates access to the merged menu file, and after the menu file is read into the browser, the menu file is loaded into a web page).

From the above technical solutions, it can be known that according to the dynamic management method for a menu, the server, the system, and the computer-readable storage medium provided by the embodiments of the present disclosure, menu change messages are forwarded and temporarily stored through a message-oriented middleware cluster, and that there is no longer a need for a dedicated central node for menu processing. Menu information that is not written into the storage is saved in the message-oriented middleware. Once a unit capable of menu processing is started or runs normally, it can process, store, and merge menu messages. Due to the cluster deployment mode of the message-oriented middleware, even if a message-oriented middleware instance is abnormal, it will not affect registration and uninstallation of menus in the system. The system adopts a decentralized architecture, and all the modules are independent of one another in terms of startup sequence. Even if the menu change management module and the menu merging module are started after a menu is registered, the menu change management module and the menu merging module registered menu can still obtain the registered menu after being started.

In addition, by creating a unified menu model, definition of menus becomes more standardized and consistent, which ensures correctness of menu registration and logic of subsequent merging of menus. When the menus are merged, an existing menu set in the system is customized according to a function subset defined by a current portal unit, which renders the menu processing more flexible. For all changes of functions, a menu can be flexibly modified to make the menu consistent with the functions.

Those persons of ordinary skill in the art shall appreciate that all or some of the steps of the methods disclosed above, and the functional modules/units of the systems and devices disclosed above, may be implemented as software, firmware, hardware, and any suitable combinations thereof. In hardware implementations, the division between functional modules/units referred to in the above description does not necessarily correspond to the division between physical components. For example, one physical component may have multiple functions, or one function or step may be executed by a combination of a plurality of physical components. Some or all of the physical components may be implemented as software executed by a processor, such as a central processing unit, a digital signal processor or a microprocessor, or be implemented as hardware, or as an integrated circuit, such as an application-specific integrated circuit. Such software may be distributed on a computer-readable medium which may include computer storage medium (or non-transitory medium) and communication medium (or transitory medium). As known by those of ordinary skill in the art, the term computer storage medium includes volatile and nonvolatile, removable and non-removable medium implemented in any method or technology for storage of information (such as computer-readable instructions, data structures, program modules, or other data). Computer storage medium includes, but is not limited to, RAM, ROM, EEPROM, flash memory or other memory technologies, CD-ROM, digital versatile disk (DVD) or other optical disk storages, magnetic cassettes, magnetic tapes, magnetic disk storages or other magnetic storages, or any other medium that can be used to store desired information and can be accessed by a computer. In addition, it is known to those of ordinary skill in the art that, communication medium typically contains computer-readable instructions, data structures, program modules or other data in a modulated data signal such as a carrier wave or other transport mechanism, and may include any information delivery medium.

It shall be noted that, in this text, the terms "include", "comprise" or any other variants thereof are intended to cover non-exclusive inclusion, so that a process, a method, an article or a device including a series of elements not only includes those elements, but also includes other elements not explicitly listed, or elements inherent to the process, the method, the article, or the device. Without further restrictions, an element limited by the phrase "including a . . . " does not exclude the existence of other identical elements in a process, a method, an article or a device that includes the element.

The serial numbers of the foregoing embodiments of the present disclosure are provided only for description, and do not represent superiority and inferiority of the embodiments.

The above is a description of the embodiments of the present disclosure with reference to the accompanying drawings. The present disclosure, however, is not limited to the specific embodiments above. The specific embodiments above are merely exemplary rather than restrictive. Those of ordinary skill in the art, based on teachings of the present disclosure, can make various variations without departing from the spirit of the present disclosure and within the protection scope of the claims. All such variations shall be considered as falling within the protection scope of the present disclosure.

What is claimed is:

1. A dynamic management method for a menu, comprising:
   collecting, when a function on an independently deployed functional unit changes, a menu change message generated when the function changes;
   receiving the menu change message through a message-oriented middleware deployed in a cluster mode, and broadcasting the menu change message; and
   monitoring and parsing, at a portal unit, the menu change message, and updating a menu displayed on an interface,
   wherein before collecting the menu change message generated when the function changes, the method further comprises:
   saving menu information corresponding to respective functional units separately by using a distributed database or a distributed cache to generate a menu set,
   wherein after monitoring and parsing, at the portal unit, the menu change message, and updating the menu displayed on the interface, the method further comprises:
   acquiring, when the portal unit provides a set of some functions, menu identification information corresponding to a menu displayed by the portal unit and the menu set, and obtaining an intersection of the menu identification information and the menu set as a set of merged menus; and
   organizing the set of merged menus into a menu tree structure, and converting menu tree nodes according to a display format to generate a menu display file.

2. The dynamic management method for a menu according to claim 1, wherein before collecting the menu change message generated when the function changes, the method further comprises:
   creating a unified menu model, defining a menu of respective functional units separately according to the unified menu model, and generating a corresponding menu definition file.

3. The dynamic management method for a menu according to claim 1, wherein the menu change message comprises a menu registration message and a menu uninstallation message.

4. The dynamic management method for a menu according to claim 3, wherein parsing the menu change message comprises:
   parsing, when the menu registration message is monitored, menu information in the menu registration message, and making an addition or a modification to a menu set; and
   parsing, when the menu uninstallation message is monitored, menu identification information in the menu uninstallation message, and deleting a corresponding menu from the menu set.

5. The dynamic management method for a menu according to claim 1, wherein after generating the menu display file, the method further comprises:
   sending the menu display file to a corresponding display interface, and updating a menu on the display interface.

6. A server, comprising a processor, a memory, and a data bus, wherein
   the data bus is configured to realize connection and communication between the processor and the memory; and
   the processor is configured to execute a memory model calculation program stored in the memory so as to implement the following steps:
   collecting, when a function on an independently deployed functional unit changes, a menu change message generated when the function changes;
   receiving the menu change message through a message-oriented middleware deployed in a cluster mode, and broadcasting the menu change message; and
   monitoring and parsing, at a portal unit, the menu change message to obtain a menu display file,
   wherein before collecting the menu change message generated when the function changes, the method further comprises:

saving menu information corresponding to respective functional units separately by using a distributed database or a distributed cache to generate a menu set, wherein after monitoring and parsing, at the portal unit, the menu change message, and updating the menu displayed on the interface, the method further comprises:

acquiring, when the portal unit provides a set of some functions, menu identification information corresponding to a menu displayed by the portal unit and the menu set, and obtaining an intersection of the menu identification information and the menu set as a set of merged menus; and organizing the set of merged menus into a menu tree structure, and converting menu tree nodes according to a display format to generate a menu display file.

7. A dynamic management system for a menu, wherein the system comprises at least one server and a plurality of clients, the server being provided therein with a plurality of functional units and a plurality of portal units, and the clients each being provided with a display interface corresponding to a respective one of the portal units; and wherein in the system, the following steps are implemented:

collecting, when a function on an independently deployed functional unit changes, a menu change message generated when the function changes;

receiving the menu change message through a message-oriented middleware deployed in a cluster mode, and broadcasting the menu change message;

monitoring and parsing, at a portal unit, the menu change message to obtain a menu display file; and sending the menu display file to a corresponding display interface, and updating a menu on the display interface, wherein before collecting the menu change message generated when the function changes, the method further comprises:

saving menu information corresponding to respective functional units separately by using a distributed database or a distributed cache to generate a menu set, wherein after monitoring and parsing, at the portal unit, the menu change message, and updating the menu displayed on the interface, the method further comprises:

acquiring, when the portal unit provides a set of some functions, menu identification information corresponding to a menu displayed by the portal unit and the menu set, and obtaining an intersection of the menu identification information and the menu set as a set of merged menus; and organizing the set of merged menus into a menu tree structure, and converting menu tree nodes according to a display format to generate a menu display file.

* * * * *